(12) United States Patent
Bonaiti

(10) Patent No.: US 6,237,201 B1
(45) Date of Patent: May 29, 2001

(54) CONNECTOR WITH SNAP CLOSURE

(75) Inventor: Marco Bonaiti, Lecco (IT)

(73) Assignee: Kong S.p.A., Lecco (IT)

( * ) Notice: Subject to any disclaimer, the term of this patent is extended or adjusted under 35 U.S.C. 154(b) by 0 days.

(21) Appl. No.: 09/358,618

(22) Filed: Jul. 21, 1999

(30) Foreign Application Priority Data

Jul. 22, 1998 (IT) .............................. MI98A1697

(51) Int. Cl.[7] .................................................. F16B 45/06
(52) U.S. Cl. ........................ 24/598.5; 24/601.5; 24/648; 294/82.18
(58) Field of Search .............................. 24/495–497, 500, 24/509, 511, 598.5, 601.5, 647, 648, 650, 643; 294/82.32, 82.18, 110.1, 19.3

(56) References Cited

U.S. PATENT DOCUMENTS

| | | | |
|---|---|---|---|
| 540,801 | * | 6/1895 | Payne . |
| 1,576,050 | * | 3/1926 | Jellison . |
| 1,622,971 | | 3/1927 | Porter . |
| 2,234,853 | | 3/1941 | Brueggeman . |
| 2,476,734 | * | 7/1949 | Jellison . |
| 2,591,638 | * | 4/1952 | Trafton . |
| 3,632,145 | * | 1/1972 | Davis . |
| 4,900,043 | * | 2/1990 | Kho . |
| 4,977,649 | * | 12/1990 | Smetz . |
| 5,033,171 | * | 7/1991 | Kasai . |
| 5,174,701 | * | 12/1992 | Small . |
| 5,713,112 | * | 2/1998 | Genero et al. . |

FOREIGN PATENT DOCUMENTS

| | | |
|---|---|---|
| 0 465 995 | 1/1992 | (EP) . |
| 0 769 626 | 4/1997 | (EP) . |
| 2 132 678 | 7/1984 | (GB) . |

* cited by examiner

Primary Examiner—James R. Brittain
(74) Attorney, Agent, or Firm—Young & Thompson

(57) ABSTRACT

A connector with snap closure comprises a pair of levers elastically stressed, each lever having a formed end for performing the closure for the connector, and the other formed end for providing a snap element and an element for manual control of opening of the connector.

6 Claims, 3 Drawing Sheets

CONNECTOR WITH SNAP CLOSURE

FIELD OF THE INVENTION

The present invention relates to a connector with snap closure which is used for hooking a rigid element such as an eyelet of a piton, a bar or the like.

BACKGROUND OF THE INVENTION

In a device of this type the lever of the connector remains open on hooking of the connector onto the rigid body and only closes when the rigid body exerts an appropriate pressure on an appropriate snap part, thus avoiding having to open and insert the mouthpiece of the connector in the slot of the rigid body which has to be hooked, and also avoiding operating with the same hand in order to open the connector and keep it open.

A connector with snap closure is traditionally formed by a body with a general C shape having a central hole which leads into a front mouthpiece, and a sliding part stressed elastically to perform closure of the connector.

In particular the sliding part is jointed to a manual control part and is actuated in closure by means of an appropriate snap part.

The snap part in turn is provided with a complex system of snap means of hooking with the manual control part and the sliding part.

The presence of a plurality of parts and of a complicated system of connections between the snap part and the remaining parts of the connector may cause jamming thereof due to dust or external agents, and simultaneously restricts the performances thereof in terms of accuracy of the value of the force which permits release of the snap part and consequently closure of the same connector.

A connector of this type thus has an especially complex structure and becomes particularly expensive.

The object of the present invention is that of providing a connector with snap closure which eliminates the disadvantages found with traditional devices and which offers high standards of performances and is found to be reliable, simple, rugged and inexpensive.

Another object of the present invention is that of providing a connector which does not allow accidental opening in the case of impact or rubbing against the rock or the rope.

SUMMARY OF THE INVENTION

These and other objects are achieved using the connector with snap closure of the present invention, in accordance with the independent claim listed hereinbelow.

The snap connector of the present invention is characterised by the presence of a lever or of a pair of levers stressed elastically and whereon the means of closure of the connector are formed in one single piece, consisting of the element of closure of the mouthpiece of the containing area, the part for manual control of the opening of the connector and the snap element of the connector.

The advantage of providing a lever with a profile adapted and designed to perform three different functions, that is to say closure of the mouthpiece of the containing area, manual resetting and the snap of the connector, lies in the fact that the total number of the parts and of the relevant interconnections is considerably reduced, thus appreciably simplifying the device and in particular the mechanism of release of the snap and simultaneously ensuring reliable operation and accurate performances.

BRIEF DESCRIPTION OF THE DRAWINGS:

A preferred embodiment of the present invention will be described with reference to the accompanying drawings, in which.

In the various accompanying drawings the corresponding parts of the connector are denoted by identical reference signs.

DESCRIPTION OF PREFERRED EMBODIMENTS

Figure 1B:
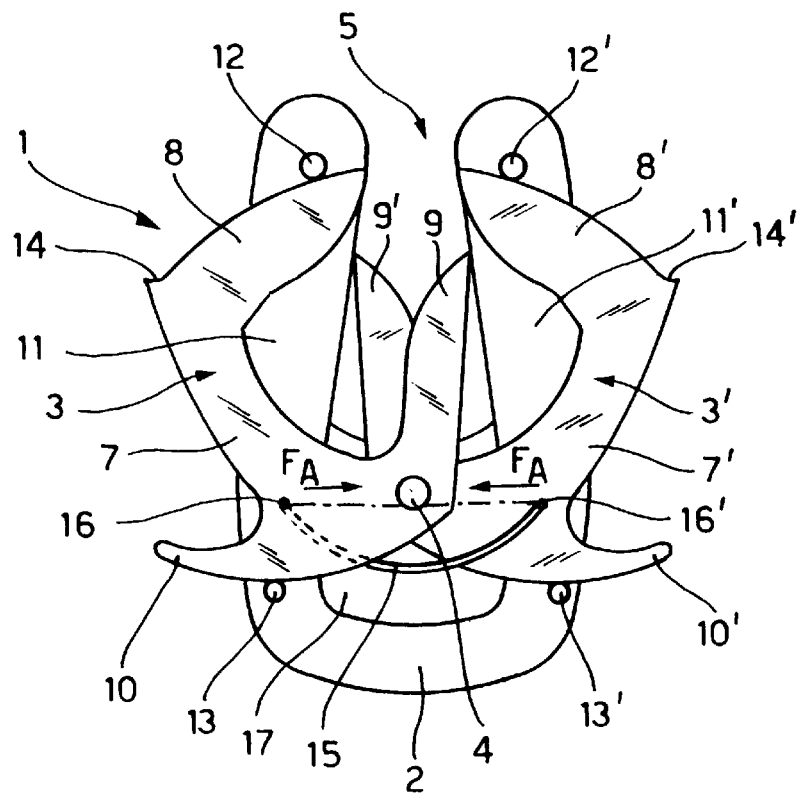
FIGS. 1a and 1b show a plan view of a connector and respectively of a detail of a connector with two levers according to the present invention in an opening position.
Figure 1A:
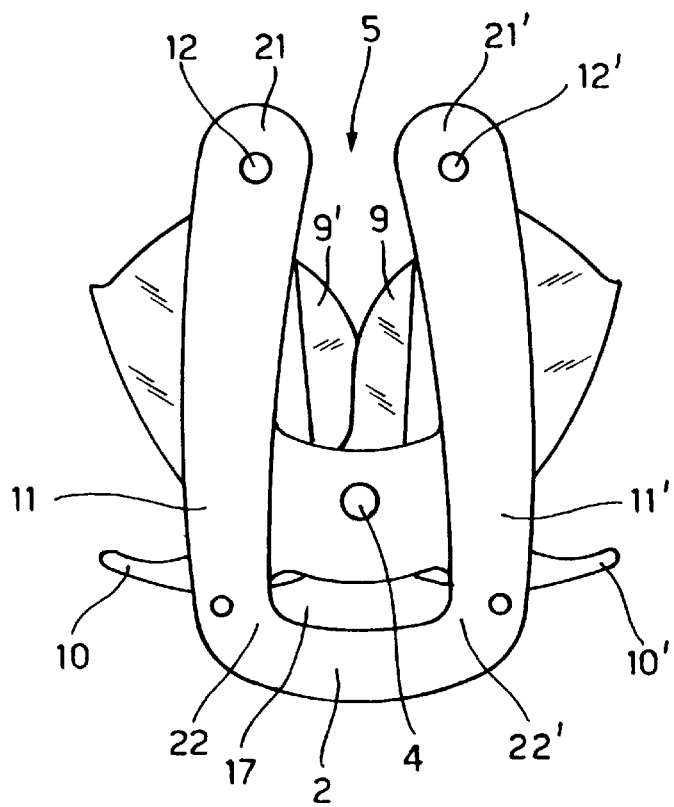

In FIGS. 1a, 1b, 2a, 2b and 3 the connector 1 is shown according to a preferred embodiment.

The connector 1 comprises a rigid body formed by two identical parts with a general C shape and denoted by 2, whereon two levers 3 and 3', with identical shape, are supported for rotation around the common pin 4 and are arranged symmetrically in relation to the axis of the rigid body 2 passing through the pin 4.

The rigid body 2 is provided with a front mouthpiece 5 for access to an area 6 for containing the body to be hooked to the connector, formed for example by the eyelet of a piton, and, on the opposite side, by an appropriately shaped hole 17, designed to house a tape or a rope.

In a variant of the present embodiment a wall of the hole 17 of the rigid body 2 can be mobile to allow opening of the hole 17 and consequently easy replacement of the tape or rope contained therein.

The levers 3 and 3' have been appropriately shaped in order to perform unhooking without the need for additional parts.

Each lever 3 and 3' is thus formed by a longitudinal plate 7, 7', one of whose ends is shaped to define a crosspiece 8, 8'.

The other end of the plate 7, 7' extends with a first and a second transverse fin 9 and 10, of which the first 9 is arranged in relation to the plate 7, 7' on the same part as the crosspiece 8, 8', while the second 10 is arranged on the opposite side.

The external edge of the crosspiece 8, 8' has a profile describing a circumference arc with centre in 4.

A support pin 12, 12' in stainless steel, or another suitable material, attached to the end 21, 21' of the plate 11, 11' of the rigid body 2, is positioned at such a distance from the centre 4 so as to rest on the external edge of the crosspiece 8,8' without hindering rotation of the same 8, 8'.

The part of the profile of the crosspiece 8, 8' which resembles a circumference arc can therefore slide adjacent to the support pin 12, 12' and perform an angular stroke which stops during opening when the fin 10, 10' strikes a stop pin 13, 13' attached to the end 22, 22' of the plates 11 and 11' of the rigid body 2, and during closure when the pin 12, 12' engages a flap 14, 14' of the external edge of the crosspiece 8, 8'.

A return spring formed by a curved metal wire 15 is hinged on two symmetrical points 16 and 16' of the levers 3 and 3' in such a way that the line joining the two points 16 and 16' (denoted by a dotted and dashed line in FIGS. 1b and 2b) lies below the rotation pin 4 in the position of opening of the connector 1, and above the rotation pin 4 in the position of closure of the connector 1.

In the case wherein a different tension is to be given to the return spring, the hinging points 16 and 16' can be provided on the levers 3 and 3' also in an asymmetrical position.

The housing of the metal wire 15 is formed by the reduction in thickness of the levers 3 and 3' between which the metal wire 15 can therefore be placed.

The metal wire 15 must have a shape compatible with the movements necessary inside the device, that is to say that it must not tangle with the rotation pin 4.

The following is an illustration of the functioning of the connector 1.

The connector 1 is first brought into the position of opening.

In order to do this, the fins 10 and 10' have to be pulled with the fingers, which fins act as an element for manual control of opening in that they cause the simultaneous rotation of the levers 3 and 3' until they strike the stop pins 13 and 13'.

The levers 3 and 3' maintain this position given that the line joining the points 16 and 16' and lying below the centre 4 coincides with the line of action of the metal wire 15 on the same levers 3 and 3'. The force indicated by Fa then generates on the levers 3 and 3' a torque which keeps them open and in contact with the stop pins 13 and 13'.

The correct positioning of the stop pin 13, 13' is essential for ensuring that, when the connector is open, the crosspiece 8, 8' completely frees the front mouthpiece 5 of the rigid body 2 and the fin 9, 9' is arranged in a central portion of the containing area.

The fins 9 and 9' function as a snap element. When the body to be hooked to the connector 1, for example the eyelet of a piton, penetrates the containing area 6 through the front mouthpiece 5 and presses between the tips of the fins 9 and 9', the levers 3 and 3' tend to rotate for closure of the connector 1, but are opposed by the action of the metal wire 15. However at the moment when, due to the pressure exerted by the body to be hooked, the rotation of the levers 3 and 3' is sufficient to make the line joining the points 16 and 16' move from below to above the centre 4 which acts as a fulcrum, the levers 3 and 3' are released for closure of the connector 1.

More particularly the crosspieces 8 and 8', following rotation of the levers 3 and 3', act as elements for closure of the connector 1, completely invading the front mouthpiece 5 and confining the body to be hooked inside the confining area 6.

The structural simplification introduced by providing a lever 3, 3' is therefore clear, which lever, by means of an appropriate design of its profile, incorporates in one single piece the means of closure, that is to say the element of closure of the mouthpiece of the containing area, the element of manual control of opening and the snap element of the connector, and performs all the functions with extreme simplicity.

The rotation for closure of the levers 3 and 3' stops when the flaps 14 and 14' engage in the pins 12 and 12'.

Together with this use of them, the support pins 12 and 12', with the pin 4, naturally also serve to absorb the traction stresses transmitted by the levers 3 and 3'.

Figure 2B:
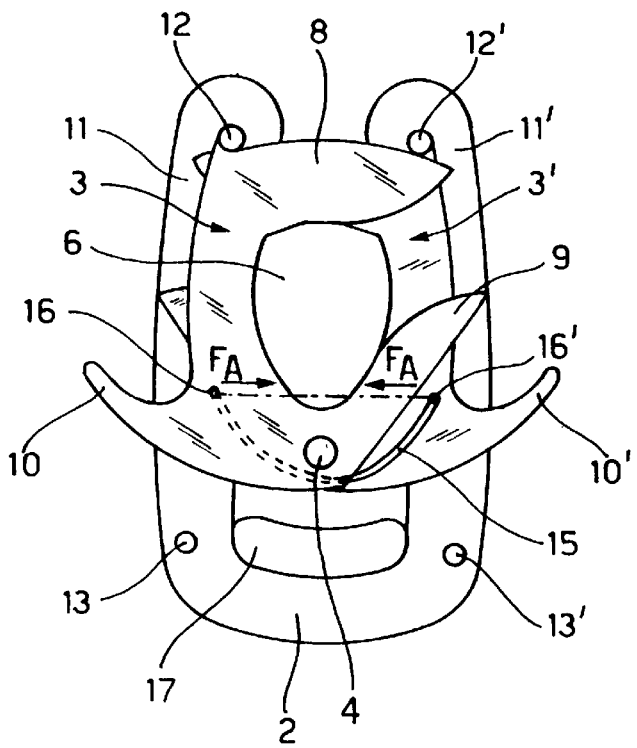
FIGS. 2a and 2b show a plan view of the connector of the previous figure in a closure position.
Figure 2A:
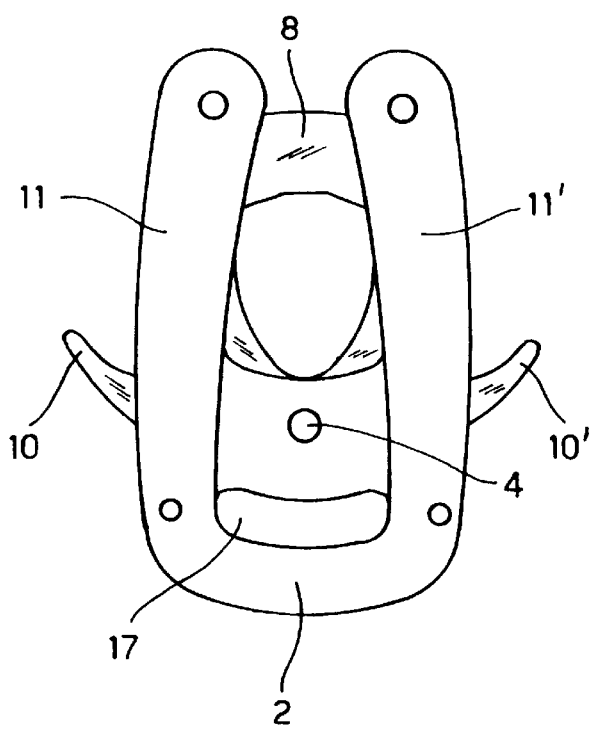
Figure 3:
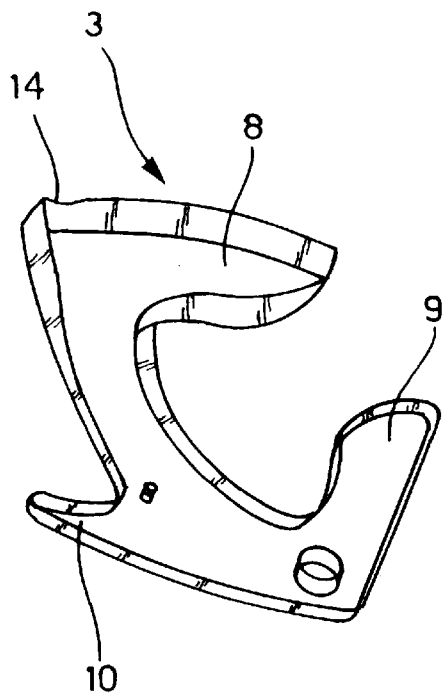
FIG. 3 is a perspective view of a lever of the connector of the previous figures.
Figure 4:
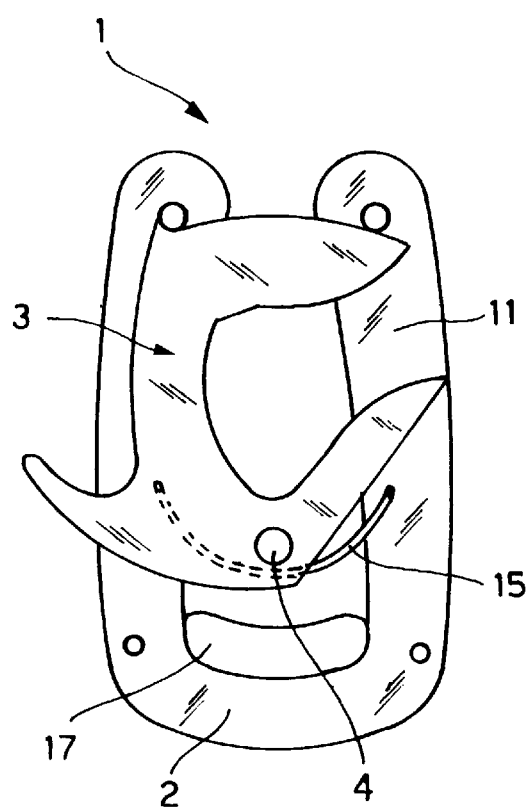
FIG. 4 shows a plan view of a detail of a connector with only one lever a according to the present invention.

FIG. 2a shows also that the dynamics of closure of the connector leads to a configuration wherein the movement of the body to be hooked in the containing area 6 is not hindered by the fins 9 and 9' used for the snap, the latter moving to take up position between the plates 11 and 11' of the two parts forming the rigid body 2 in such a way as to free the containing area 6 completely.

So that the connector 1 can only be "actuated" when the levers are both brought into a position of complete opening and that it moves into a closure position when the levers are released from any other position which is not that of opening, the arrangement of the points 16 and 16' in relation to the rotation pin 4 is chosen carefully, bearing in mind that the connector 1 only remains open if the direction of the force of the spring 15 on the levers 3 and 3' goes beyond the centre of rotation 4 of the same and localising this type of behaviour only at the limit of the stroke of opening of the levers 3 and 3'.

The presence of two levers in this embodiment guarantees against opening in the case of rubbing or impact against the face or rock. In order to open the connector, both crosspieces 8 and 8' must clear completely the front mouthpiece 5 of the rigid body 2. Impact or rubbing against faces and rocks may cause the opening of one single lever, but the opening of the connector is very unlikely, which requires instead a combined and simultaneous action on both levers.

The symmetry of the two parts which make up the rigid body 2 and of the two levers 3, 3' also allows these elements to be obtained from a single mould, thus simplifying the manufacturing process and consequently reducing the costs.

FIG. 5 shows another embodiment of the present invention wherein the connector 1 is formed by a single lever 3.

In this case the return spring 15 is hinged at one end on the lever 3 and at the other end on one plate 11 of the rigid body 2.

Naturally what is described in the present preferred embodiments must not limit the more general principle claimed, a person who is expert in the field being able to make changes even without departing from the sphere of the invention.

In particular a connector with two levers can be devised according to the invention and which has each lever hinged on a respective rotation pin.

According to another possible variant finally the elastic part can be in the form of an appropriately shaped plate whose ends engage on two notches appropriately formed on each lever in the case of a connector with two levers, and on the lever and on the plate of the rigid body in the case of a connector with a single lever.

What is claimed is:

1. A connector with snap closure comprising, a generally c-shaped rigid body;

a containing area defined within the rigid body;

a mouthpiece at one end of the rigid body, the mouthpiece adapted for inserting an external element into the containing area;

a hole located within the rigid body, the hole shaped to accept a tape or rope;

a rotation pin provided on the rigid body; and a pair of levers elastically stressed and rotatably supported on the rigid body by the rotation pin between an opening and a closure position, each of the pair of levers having a first end turned toward the mouthpiece and transversely bent toward the containing area so as to close said mouthpiece and containing area when the pair of levers are in the closure position, each of the pair of levers having a second end, located at a lever end opposite the first end, each second end having a first fin and a second fin, each first fin arranged as a snap element by projecting toward the containing area when the pair of levers are in the opening position, each second fin oriented away from the containing area and actuable as an element for opening of the pair of levers from the closure position.

2. The connector of claim 1, further comprising:

a supporting and sliding pin fixed to the rigid body and associated with each of the pair of levers, wherein each first end turned toward the mouthpiece and transversely bent toward the containing area has an arc-shape edge slidably supported by the associated supporting and sliding pin.

3. The connector of claim 2, further comprising:

a blocking part provided at an end of the arc-shape edge of each first end turned toward the mouthpiece and transversely bent toward the containing area, each blocking part engageable with the associated supporting and sliding pin to stop a stroke of the first end at the closure position, the closure position being achieved when the first end completely invades the mouthpiece of the rigid body.

4. The connector of claim 3, wherein the blocking part provided at an end of the arc-shape edge of each first end turned toward the mouthpiece and transversely bent toward the containing area is in the form of a flap of the arc-shape edge.

5. The connector of claim 1, further comprising:

a return spring which provides elastic stress on the pair of levers, each end of the return spring being hinged on one of the pair of levers so that the return spring performs moves the pair of levers into either the opening or the closure position based on whether a line joining the ends of the return spring is brought above the rotation pin or below the rotation pin.

6. The connector of claim 5, further comprising:

a housing for the return spring, the housing being formed being formed by a reduction in a thickness of one of the pair of levers.

* * * * *